(12) United States Patent
Calhoun

(10) Patent No.: US 10,495,953 B2
(45) Date of Patent: Dec. 3, 2019

(54) CLAMP FOR MOUNTING AND POSITIONING AN ARTICLE THEREON

(71) Applicant: Perry Calhoun, Bardstown, KY (US)

(72) Inventor: Perry Calhoun, Bardstown, KY (US)

( * ) Notice: Subject to any disclaimer, the term of this patent is extended or adjusted under 35 U.S.C. 154(b) by 0 days.

(21) Appl. No.: 16/283,299

(22) Filed: Feb. 22, 2019

(65) Prior Publication Data
US 2019/0265581 A1 Aug. 29, 2019

Related U.S. Application Data

(60) Provisional application No. 62/634,121, filed on Feb. 22, 2018.

(51) Int. Cl.
| | | |
|---|---|---|
| G03B 17/56 | (2006.01) |
| F16B 2/10 | (2006.01) |
| F16M 13/02 | (2006.01) |
| F16B 2/00 | (2006.01) |
| A01M 31/00 | (2006.01) |
| H04N 5/225 | (2006.01) |

(52) U.S. Cl.
CPC ......... *G03B 17/561* (2013.01); *A01M 31/002* (2013.01); *F16B 2/005* (2013.01); *F16B 2/10* (2013.01); *F16M 13/022* (2013.01); *H04N 5/2253* (2013.01)

(58) Field of Classification Search
CPC ..... F16B 2/10; Y10T 24/3443; G03B 17/561; B25B 3/00
See application file for complete search history.

(56) References Cited

U.S. PATENT DOCUMENTS

| | | | |
|---|---|---|---|
| 3,346,293 A | 10/1967 | Wilcox | |
| 5,934,525 A * | 8/1999 | Blanchard | A47G 25/183 |
| | | | 223/85 |
| 6,357,710 B1 * | 3/2002 | Fielden | A45B 11/00 |
| | | | 248/231.51 |
| 7,165,762 B1 | 1/2007 | Duzick | |
| D605,125 S | 12/2009 | Bizzell | |
| 8,087,626 B1 * | 1/2012 | Weeden | F16M 11/14 |
| | | | 248/218.4 |
| 8,272,612 B2 | 9/2012 | Thorpe | |
| 8,297,565 B2 | 10/2012 | McLinda | |
| 8,602,662 B1 * | 12/2013 | Mans | F16M 11/041 |
| | | | 396/428 |
| 8,857,775 B1 | 10/2014 | Clearman et al. | |
| D718,999 S | 12/2014 | Robinson et al. | |
| 9,144,160 B2 | 9/2015 | Chuang | |

(Continued)

*Primary Examiner* — Noam Reisner
(74) *Attorney, Agent, or Firm* — Carrithers Law Office, PLLC; David W. Carrithers

(57) ABSTRACT

A spring clamp for removably attaching a camera, decoy or other device to a structural support. The clamp includes two opposing arms, each including a handle component and a jaw component. The clamp can be attached to an apparatus when the two jaw components including Inward facing arcuate jaws with gripping teeth and notches are closed around the apparatus. The clamp is provided with a plurality of threaded inserts at selected positions for supporting a device such as a camera. An adjustable and positionable extension may be removably fastened to the camera mount and the camera is detachably coupled to the extension. This allows an article such as a camera to be situated at any desired angle for taking photographs.

4 Claims, 21 Drawing Sheets

(56) References Cited

U.S. PATENT DOCUMENTS

| | | |
|---|---|---|
| 9,389,491 B2 | 7/2016 | Clearman et al. |
| 2003/0080267 A1 | 5/2003 | Eslick |
| 2004/0232608 A1* | 11/2004 | Wong ............... B25B 5/006 269/249 |
| 2010/0264281 A1 | 10/2010 | Bevirt et al. |
| 2011/0308131 A1 | 12/2011 | McLinda |
| 2013/0193288 A1 | 8/2013 | Congdon |
| 2013/0333267 A1 | 12/2013 | Olien |
| 2014/0321909 A1 | 10/2014 | Bain |
| 2014/0332645 A1 | 11/2014 | Brooks |

* cited by examiner

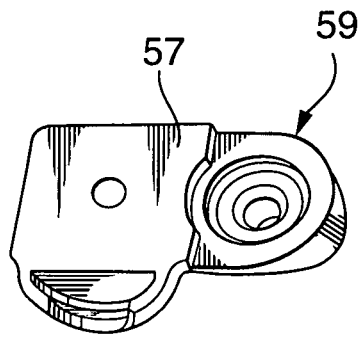
FIG. 24A
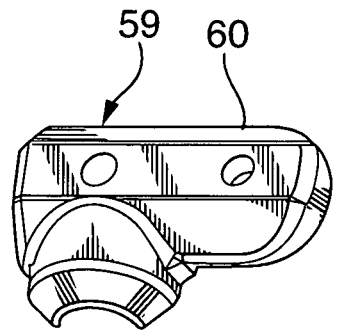
FIG. 24B
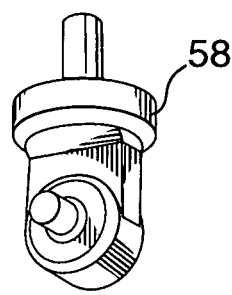
FIG. 24C
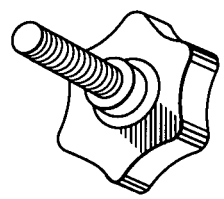
FIG. 24D
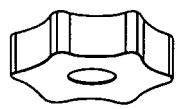
FIG. 24E

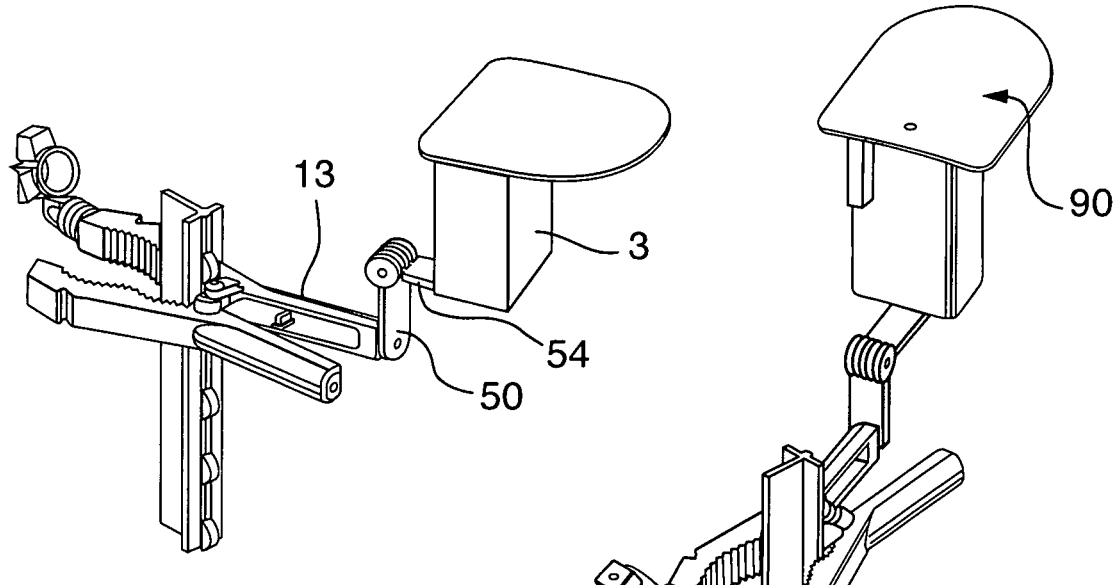
FIG. 25
FIG. 26
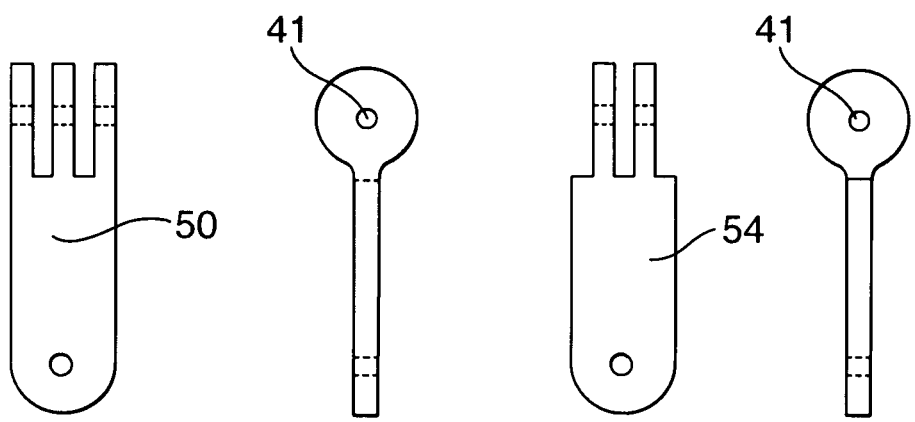
FIG. 27  FIG. 28  FIG. 29  FIG. 30

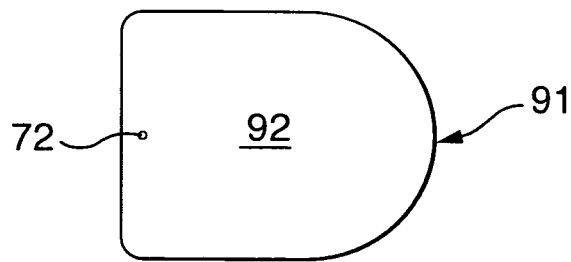
FIG. 31
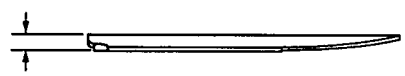 
FIG. 32     FIG. 33
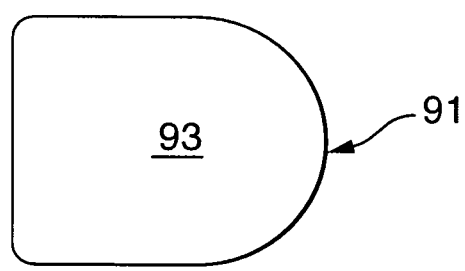
FIG. 34
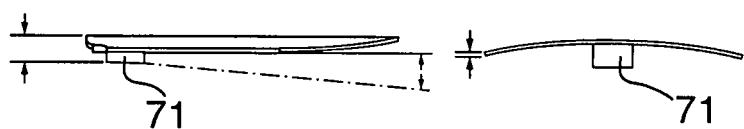 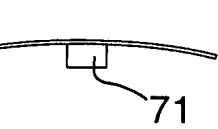
FIG. 35     FIG. 36

CLAMP FOR MOUNTING AND POSITIONING AN ARTICLE THEREON

CROSS REFERENCE TO RELATED APPLICATIONS

This application claims priority from provisional application Ser. No. 62/634,121 filed on Feb. 22, 2018 which is incorporated by reference herein in its entirety.

TECHNICAL FIELD

The present invention relates to the field of devices used to removably attach other devices to a generally longitudinal structure.

BACKGROUND OF THE INVENTION

The present invention comprises a spring clamp for removably attaching a camera, decoy or other device to a structural support. For simplification, a camera will be designed as the article to mounted to the spring clamp in the following description; however, the clamp functions to hold other articles which need to be adjustably mounted or positionable and supported by a clamp mechanism as well.

Decoy cameras are he Decoy cameras are heavy because they usually include a plurality of batteries. They usually have a threaded mount for use on tripods or stakes. These cameras are motion activated whenever an animal is in range. They usually have a threaded mount for use on tripods or stakes. Such cameras can be set up for overnight monitoring of a known or suspected trail for the purpose of photographing prey or pests such as deer, coyotes, and the cameras can function as security cameras to photograph trespassers.

Surveillance cameras for photographing game animals and other wildlife have become popular as the technology of such cameras has improved. These advanced cameras utilize a relatively inexpensive fully automatic camera which provides automatic focus, flash, aperture and shutter speed and film advance functions. Such cameras are mounted along trails, salt licks, feeders and in other areas known to be frequented by game animals and other wildlife. By using these cameras, hunters are able to use game cameras to identify trophy animals within the study area. The surveillance camera is mounted along a trail or on a fence or gate until the person returns and unloads the film for processing.

These cameras are designed to take a photograph upon sensing an animal within a preselected target area. Sensors for some cameras include photoelectric eyes which sense an interruption in a light beam between emitters and reflectors. Other types of sensors used are infrared sensors which sense the body heat of an animal. The sensitivity of an infrared receiver may be selected so as to trigger the game camera shutter release only upon receiving an infrared intensity above a given threshold, such as a level associated with a large game animal instead of a small animal. Moreover, the game camera is left out in the field during daylight and nighttime conditions and necessitates day/night enable capabilities.

A game camera may include an electro-mechanical device for selective and/or automated switching an optical lens filter for day/night operations or an electro-mechanical device for selective switching between at least one optical lens filter, such as between a day and night optical lens filter, between a first position and a second position in order to selectively insert the optical lens filter into an optical path of the camera.

The camera is typically enclosed in a camera housing, and an electronic control circuit is mounted within the camera housing and operably connected to the camera. The camera housing may be constructed as a main body and a removable cover, each being weatherproof and from an impact resistant plastic. The camera also includes various system resources, such as a memory device and a microprocessor for storing and performing a set of programmable functions. In addition, the camera may include a passive infrared sensor that detects body heat of the animal or group of animals to be photographed. An electro-mechanical device may also enclosed within the camera housing for selectively inserting an optical lens filter, such as day optical filter and a night optical filter, into an optical path of the camera in accordance with light intensity and/or a signal from a user or timer.

Conventional camera mounting systems include U.S. Design Pat. No. D605125 by Bizzell teaching a clamp with arcuate rows of gripping teeth and U.S. Pat. No. 8,857,775 by Clear man et al teaching a clamp with a camera mount.

SUMMARY OF THE INVENTION

The present invention comprises or consists of a spring clamp for removably attaching a camera, decoy or other device to a post, tree, or any convenient roughly longitudinal structure which may be a part of a larger existing structure such as a tree, fence, sign post, for example. A camera system is configured to detachably couple to a camera mount, which in turn can be attached to an apparatus. The camera mount is a spring clamp including two arms, each include a handle component and a jaw component. The spring clamp can be attached to an apparatus when the two jaw components are closed around the apparatus. Inward facing arcuate jaws with gripping teeth and notches are designed to afford the clamp with a secure, grasping capability. The clamp is provided with a plurality of threaded inserts on a plurality of surfaces on the clamp, thus enabling a device, such as a camera, to be securely stationed in a chosen spot on a given structure. The teeth and notches are hard and are capable of digging into tree bark or other soft material covering the roughly longitudinal structure, and the clamp is provided with cushioning material which removably attaches to the inward facing jaws and can thus be used to more firmly secure the clamp to smooth and hard structures such as a pipe or rod. In some cases, an adjustable and positionable camera mount extension is fastened to the camera mount, and the camera system is detachably coupled to the camera mount extension. This allows a mounted camera system to be situated at any desired angle for taking photographs. A heavy clamp is needed to secure the camera. The clamp is spring loaded and includes a gripping tip and inwardly facing arcuate row of teeth forming a arrow head pattern. The front teeth are using for gripping limbs or pipe or the like.

The present invention includes an inner center clamping area with a gripping tip and inwardly facing arcuate row of teeth forming a parabolic pattern from front to back. The back portion includes a center notch to accommodate the notches on a steel post. The last two end notches are squared shaped to fit on the longitudinal flanges of a steel post and provide lateral support. Notches or pegs are disposed inward from the front end of the clamp in order that the distal ends can be tied together with wire or even rubber bands as reinforcement if desired. The camera is held by an adjustable bracket which screws into distal end of one of the handles. Other items can be supported by the clamp such as a mounting block or swivel mount In accordance with the present invention, there is provided a attachment clamp comprising, consisting of, or consisting essentially of a clamp body and a swivel mount. The clamp body has a front side, a rear side, a bottom side, a top side, a left side and a right side. The clamp body includes two toothed left and right jaws and two left and right handle grips. At the junction of the left jaw and handle grip is an inward extending hinge. Likewise, at the junction of the right jaw and handle grip is an inward extending hinge. The hinges are over lapped together and a threaded hinge pin is inserted to hold the hinges together. A nut is threaded the hinge pin on the front side thereof.

The threaded hinge pin passes through a coil spring which is captured inside the two hinges. Two outward extending spring arms of the coil spring are captured in the grip handles where upon the spring arms urged the grip handles outward and thus the toothed jaws are urged toward each other.

The clamp includes sixteen female threaded inserts for attaching a decoy camera or any other desired device to the clamp. The threaded inserts are preferably quarter-20 threaded inserts. On the front side are four inserts. On the back side are four inserts. On the right side and left side are four inserts (two on each side). On the top side and bottom side are four inserts (two on each side).

The two jaws and include two arcuate sets of inward facing teeth, and inner set and an outer set. Each of the two sets face toward each other so that when a longitudinal member such as a tree limb, rod or pipe is captured between either set of arcuate teeth, the two jaws urge their teeth toward one another and therefore, firmly grasp the longitudinal member. The longitudinal member need not be smoothly formed as the teeth are urge against whatever surface they contact. Between the hinges and the inner jaws, are two rectangular notches which will receive the opposing flanges of a T-post, as shown in the figures, in particular in FIG. 4. The notches are arranged and sized to firmly grasp the flanges of the T-post. This particular arrangement provides an especially steady grip of the clamp onto a T-post.

A heavy clamp is needed to secure the camera to a structural member such as a post. The clamp is spring loaded and includes a gripping tip and inwardly facing arcuate row of teeth forming a arrow head pattern. The front teeth are using for gripping limbs or pipe or the like. The present invention includes an inner center clamping area with a gripping tip and inwardly facing arcuate row of teeth forming a parabolic pattern from front to back. The back portion includes a center notch to accommodate the notches on a steel post. The last two end notches are squared shaped to fit on the longitudinal flanges of a steel post and provide lateral support. Outward extending notches are disposed inward from the top end of the clamp in order that the distal ends can be tied together with wire or even rubber bands as reinforcement if desired. The clamp body includes a plurality of threaded inserts for connecting various mount. The camera is held by an adjustable swivel mount employing a type of clampable ball and socket joint which screws into any of the threaded inserts in the clamp. Other items can be supported by the clamp such as a mounting block, light, flag, decoy or other desired object.

It is an object of this invention to provide a decoy camera attachment clamp which includes spring loaded toothed jaws which can grasp a roughly shaped longitudinal projection and which contains a plurality of threaded inserts which can hold a variety o items such as a decoy camera.

It is an object of this invention to provide a decoy camera attachment clamp which includes swivel mount for attaching such a decoy camera or other desired object to the attachment clamp. The swivel mount includes a type of ball and socket joint which is fixable in a desired position by a clamping knob.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 24(A) shows a right side of a connector member;

FIG. 24(B) shows a left side of a connector member;

FIG. 24(C) shows a ball mount with stud held between the connector members of FIGS. 24(A) and 24(B);

FIG. 24(D) shows a threaded knob for adjusting the pressure exerted on the ball mount by the connector members;

FIG. 24(E) shows a nut for cooperatively engaging the stud shown in FIG. 24(C);

FIG. 25 shows a side view of a rain/sun deflector mounted to the top of a camera mounted to a pivotal cam clamp connector;

FIG. 26 shows a rear view of a rain/sun deflector mounted to the top of a camera mounted to a pivotal cam clamp connector;

FIG. 27 shows a first clamp connector arm of FIG. 25;

FIG. 28 shows a side view of the first clamp connector arm of FIG. 27;

FIG. 29 shows a second clamp connector arm for cooperatively engaging the first clamp connector arm of FIG. 27

FIG. 30 shows a side view of the second clamp connector arm of FIG. 29;

FIG. 31 shows a top view of the rain/sun deflector panel;

FIG. 32 shows a side view of the rain/sun deflector panel of FIG. 31;

FIG. 33 shows a front view of the rain/sun deflector panel of FIG. 31;

FIG. 34 shows a bottom view of the rain/sun deflector panel;

FIG. 35 shows a side view of the rain/sun deflector panel of FIG. 31 depicting the spacer member disposed between the deflector panel and connector;

FIG. 36 shows a rear view of the rain/sun deflector of FIG. 31 showing the spacer and rear of the deflector panel;

DESCRIPTION OF THE PREFERRED EMBODIMENTS

Figure 1:
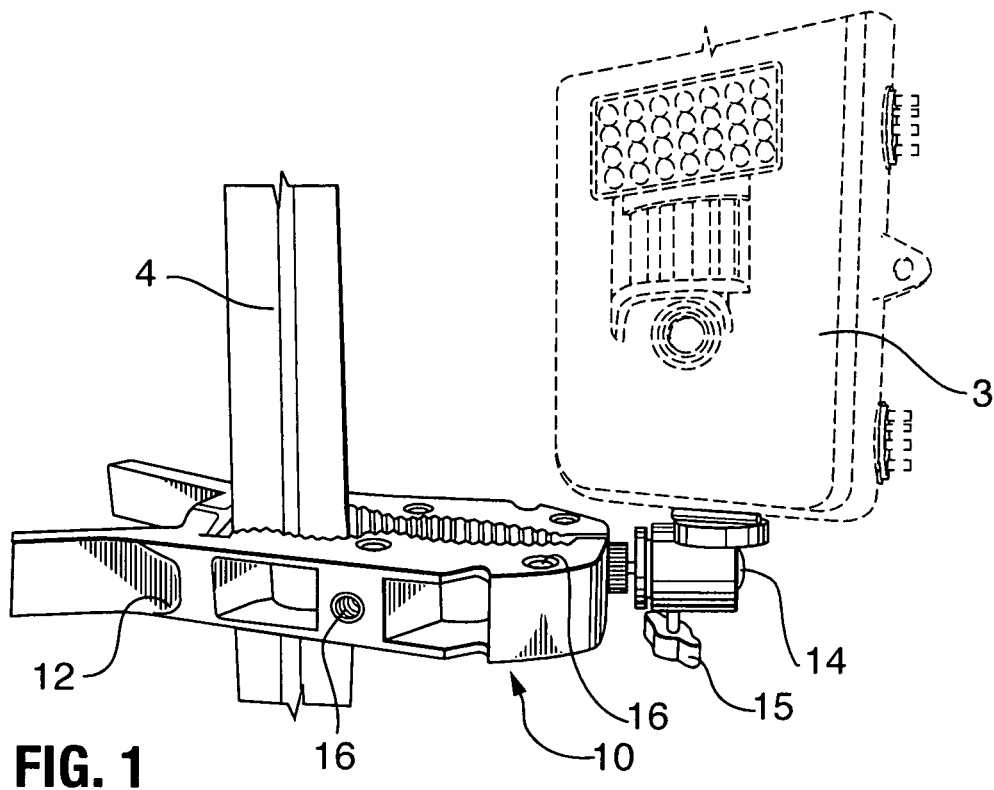
FIG. 1 is a right side view of the attachment clamp attached to a T-post and holding a decoy camera.
Figure 2:
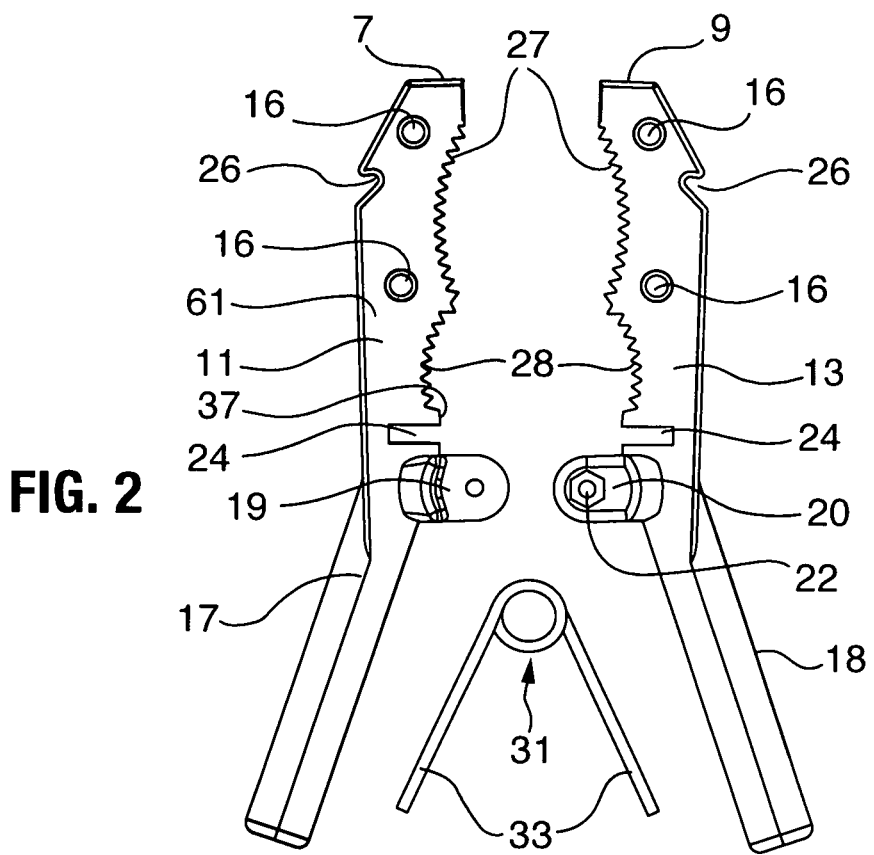
FIG. 2 is a front view of a disassembled attachment clamp.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the Figures. As used herein, the term "about" can be reasonably appreciated by a person skilled in the art to denote somewhat above or somewhat below the stated numerical value, to within a range of ±10%.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention comprises or consists of a spring clamp for removably attaching a camera, decoy or other device to a post, tree, or any convenient roughly longitudinal structure which may be a part of a larger existing structure such as a tree, fence, sign post, or T-post. An article to be supported such as a camera system is configured to detachably couple to a camera mount, which in turn can be attached to an apparatus. The camera is mounted on a connector supported by a spring clamp including two arms, each include a handle component and a jaw component. The spring clamp can be attached to an apparatus when the two jaw components are closed around the apparatus. Inward facing arcuate jaws with gripping teeth and notches are designed to afford the clamp with a secure, grasping capability. The clamp is provided with a plurality of threaded inserts on a plurality of surfaces on the clamp, thus enabling a device, such as a camera, to be securely stationed in a chosen spot on a given structure. The teeth and notches are hard and are capable of digging into tree bark or other soft material covering the roughly longitudinal structure, and the clamp is provided with cushioning material which removably attaches to the inward facing jaws and can thus be used to more firmly secure the clamp to smooth and hard structures such as a pipe or rod. In some cases, an adjustable and positionable camera mount extension is fastened to the camera mount, and the camera system is detachably coupled to the camera mount extension. This allows a mounted camera system to be situated at any desired angle for taking photographs. A heavy clamp is needed to secure the camera. The clamp is spring loaded and includes a gripping tip and inwardly facing arcuate row of teeth forming a arrow head pattern. The front teeth are using for gripping limbs or pipe or the like.

In accordance with the present invention, there is provided an attachment clamp including a clamp body 12 and a swivel mount or connector 14. Each cooperatively engaging clamp arm 11, 13 has a front end 61, a rear end 62, a bottom side 63, a top side 64, a first side 65 and a second side 66. The clamp body 12 includes two arms opposing joined arms 11 and 13 defining a first jaw 7 and second cooperatively engaging jaw 9 respectively. A first handle grip 17 extends from jaw 7 and a second handle grip 18 extends from jaw 9. At the junction of the jaw 7 and handle grip 17 is an inward extending hinge 19. Likewise, at the junction of the jaw 9 and handle grip 18 is an inward extending hinge 20. The hinges are over lapped together and a threaded hinge pin 21 is inserted to hold the hinges together. A nut 22 is threaded the hinge pin 21 on the front side thereof.

Figure 20:
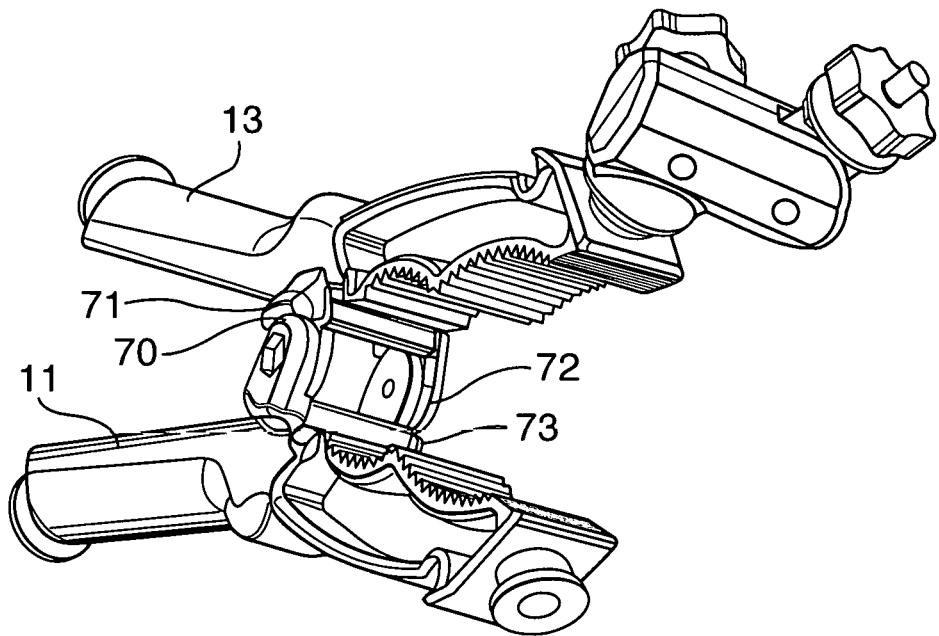
FIG. 20 is a front elevational view of the clamp and connector of FIG. 17.
Figure 21:
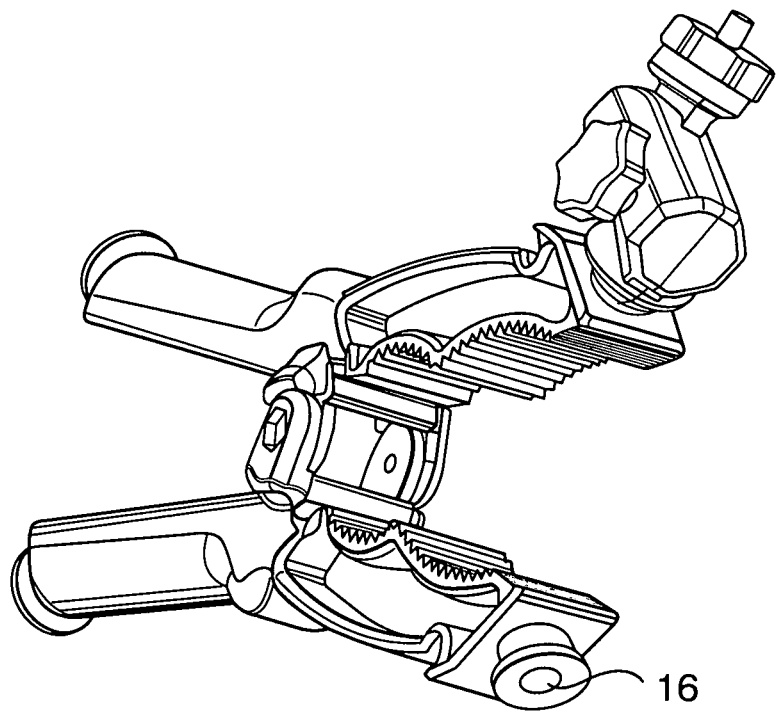
FIG. 21 is a front elevational view of the clamp of FIG. 17 with the connector shown at an angle depicting the swivel ball member.
Figure 22:
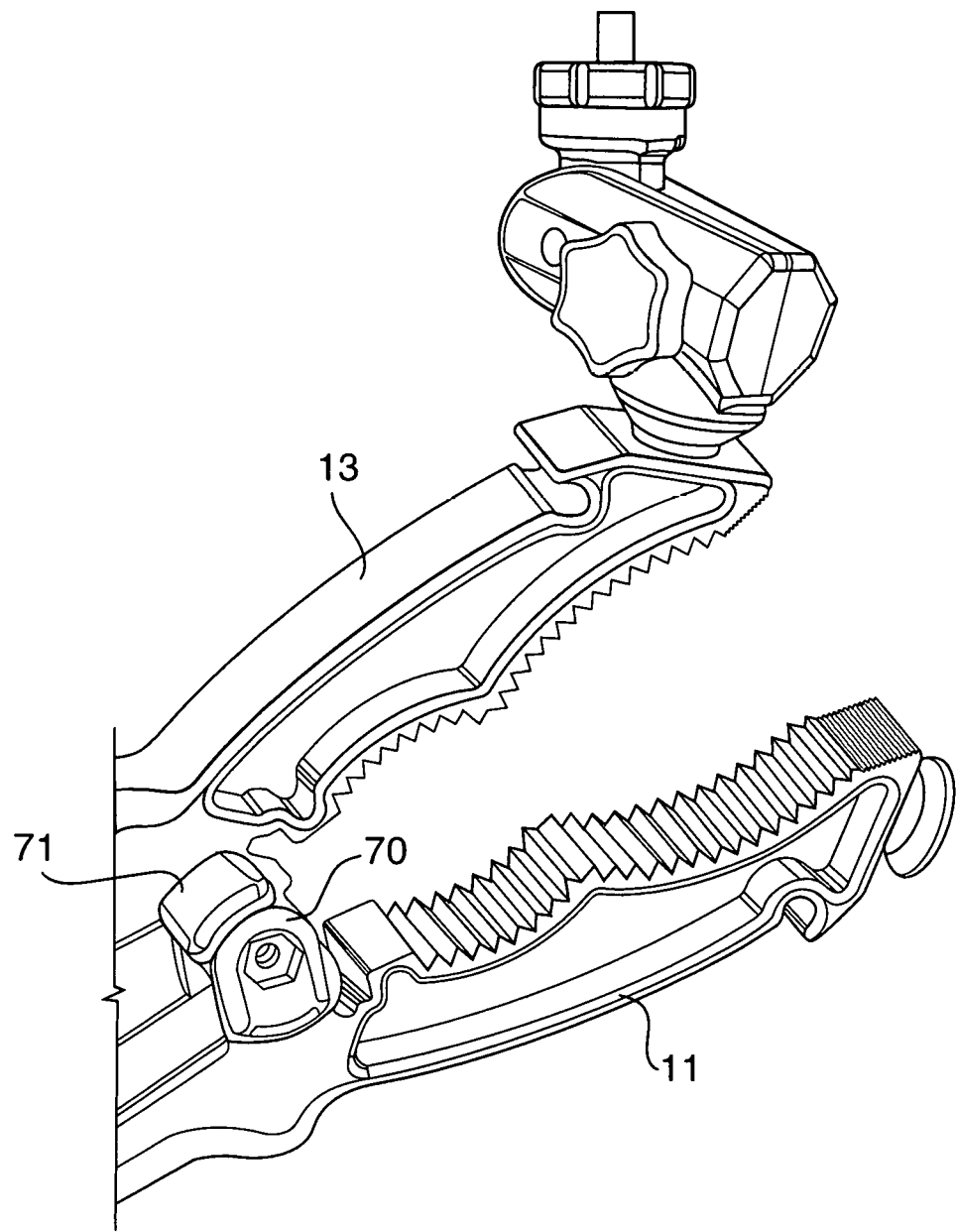
FIG. 22 is a perspective view showing the clamp of FIG. 17, with the inner surface of jaw including a notch, flat bench stop, inner arcuate ribbed section, outer arcuate ribbed section, and gnarled or fine ribbed pattern on the tip.
Figure 23:
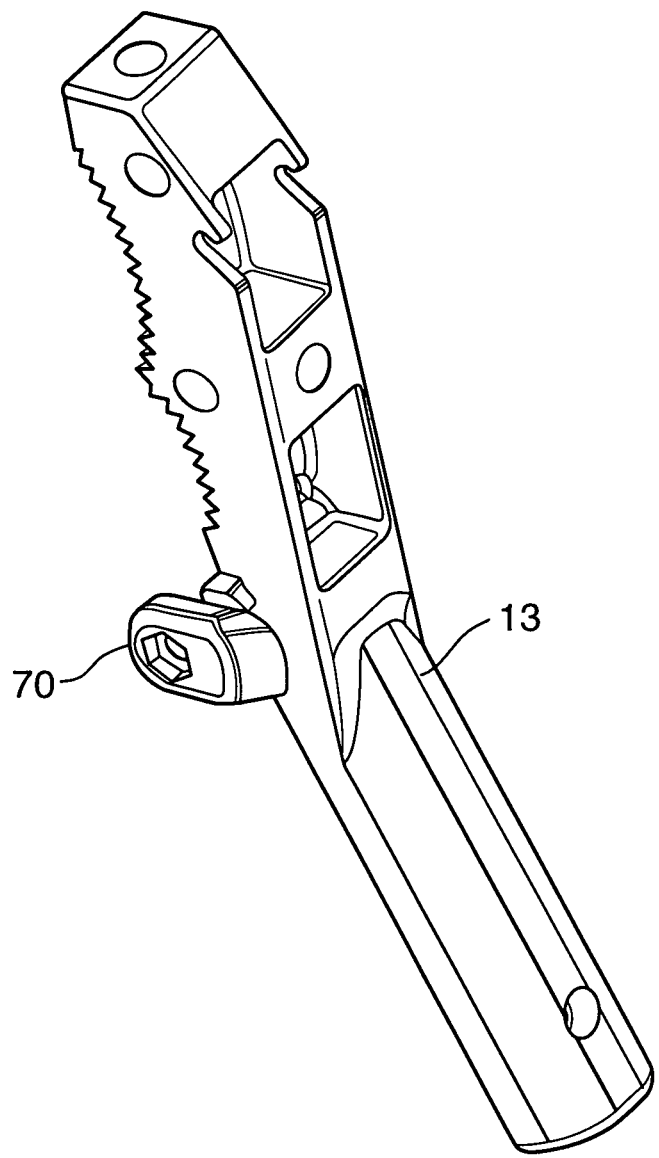
FIG. 23 is a perspective view of a clamp arm showing the outer convex shoulder of the hinge in cooperative pivotal engagement with a mating arcuate concave flange for supporting the hinge.
Figure 37:
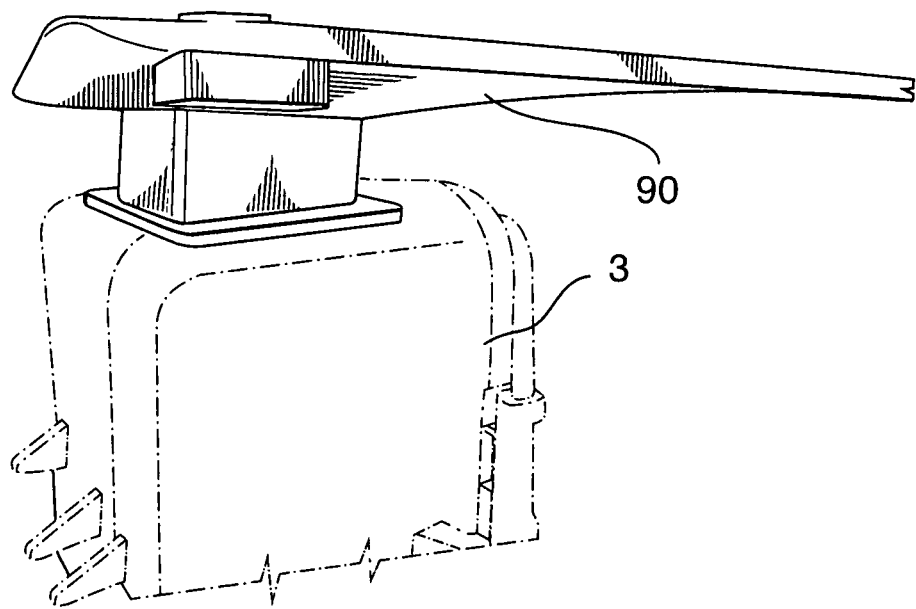
FIG. 37 is a perspective view showing a deflector mounted to a spacer atop a camera.
Figure 38:
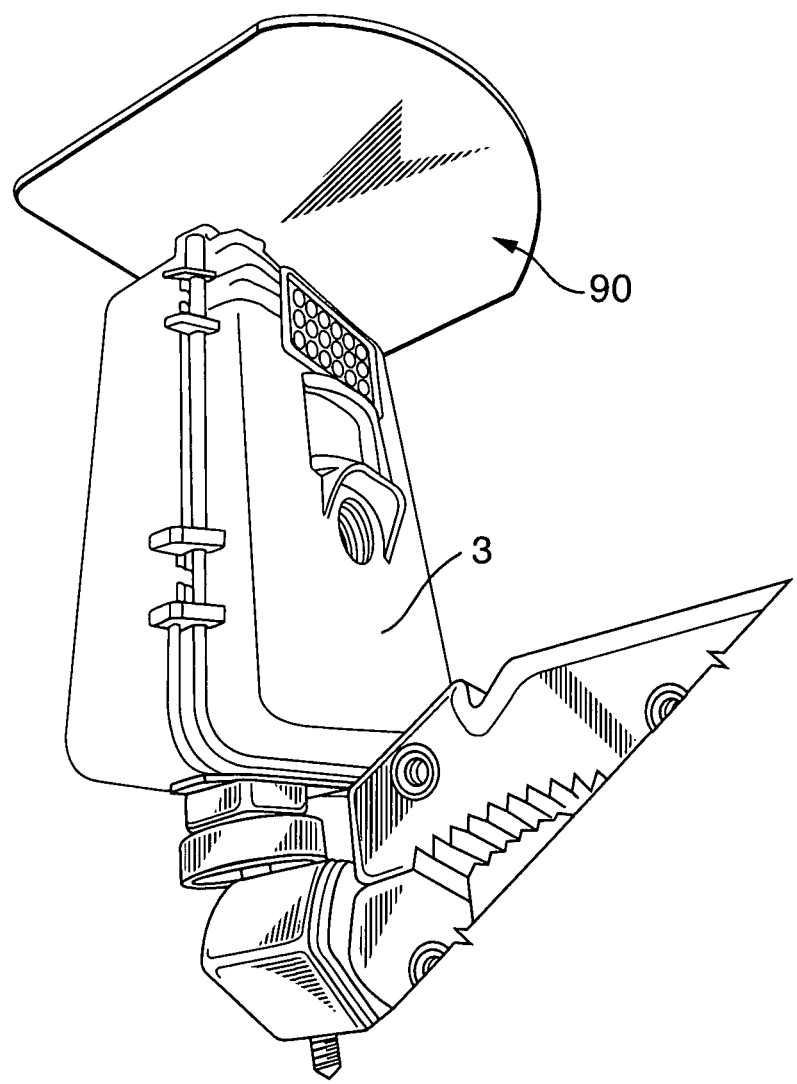
FIG. 38 is a perspective view showing a connector extending from a clamp supporting a camera having a rain/sun deflector.
Figure 39:
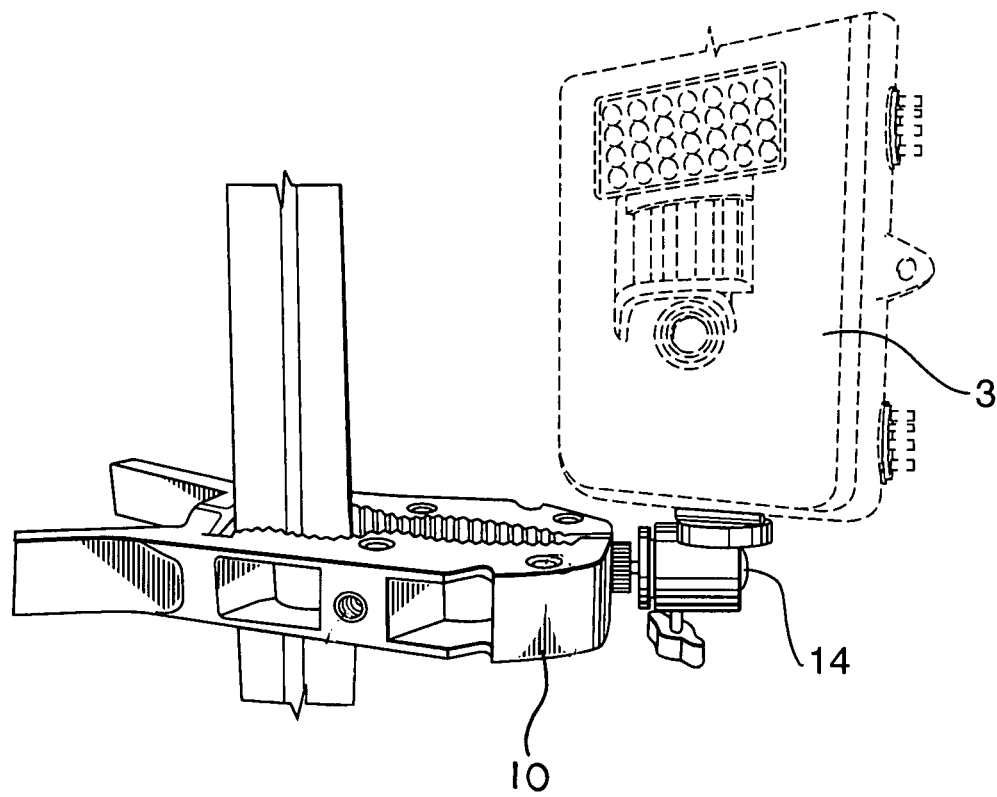
FIG. 39 shows a clamp removably attached to a T-post supporting a connector hold a camera.
Figure 40:
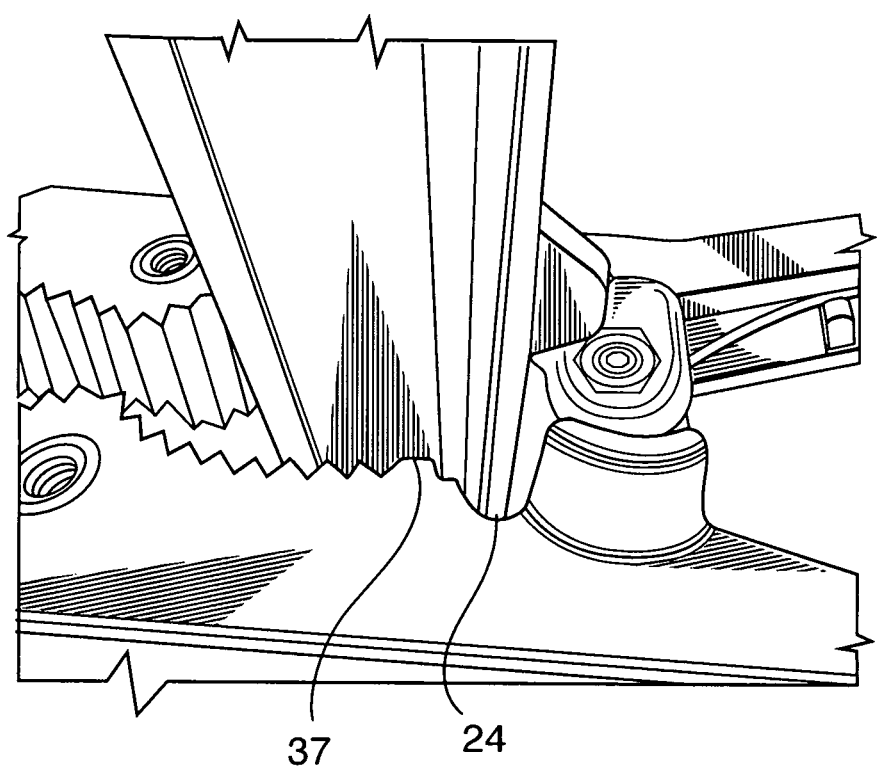
FIG. 40 is an enlarged view showing the side flange of the T-post cooperatively engaging the notch of the clamp jaw and the flat bench of the jaw abutting the side of the T-post, and the hinge abutting the back surface of the T-post.

As best shown in FIGS. 20 and 22, arm 11 has a first side including a projecting rounded or convex shoulder 70 which engages an arcuate flange 71 extending from a first side of an opposing arm 13 forming a hinge between the first side of arm 11 and arm 13. Likewise, arm 13 has a second side including a projecting rounded or convex shoulder 72 which engages an arcuate flange 73 extending from a second side of an opposing arm 11 forming a hinge between the second side of arm 11 and arm 13. The cooperatively engaging shoulder and flange members help support the hinge having a pin extending therethrough for pivotal movement.

The threaded hinge pin 21 passes through a coil spring 30 which is captured inside the two hinges 19 and 20. Two outward extending spring arms 33 of the coil spring 30 are captured in channels 34 and locked into place by notched flanges 35 formed on the inner surface of the grip handles 17 and 18 where upon the spring arms urged the grip handles 17 and 18 outward and thus the toothed or ribbed jaws 11 and 13 are urged toward each other.

As shown in the figures each arm 11,13 includes a jaw 7 and 9 respectively including an inner surface including a notch 24 at the proximate end for receiving a flange of a T-post, a flat bench stop 37 to limit closure of the clamp and grip the side walls of a T-post flange, an inner arcuate toothed or ribbed section 28 having ridges or teeth 29 extending from the first side to the second side or normal to the longitudinal direction of the arm 11, 13, an outer arcuate toothed or ribbed section 27 having ridges extending from the first side to the second side or normal to the longitudinal direction of the arm, and a gnarled or fine ribbed pattern on the surface 43 of the tip 45. The inner ribbed section is more curved and of a shorter length than the outer ribbed section. It is contemplated that the inner and outer ribbed section can include dimples spikes, ridges, a diamond pattern, or any type of raised or rough surface to enhance the grip of the surface including a polymeric coating or rubber coating.

Figure 4:
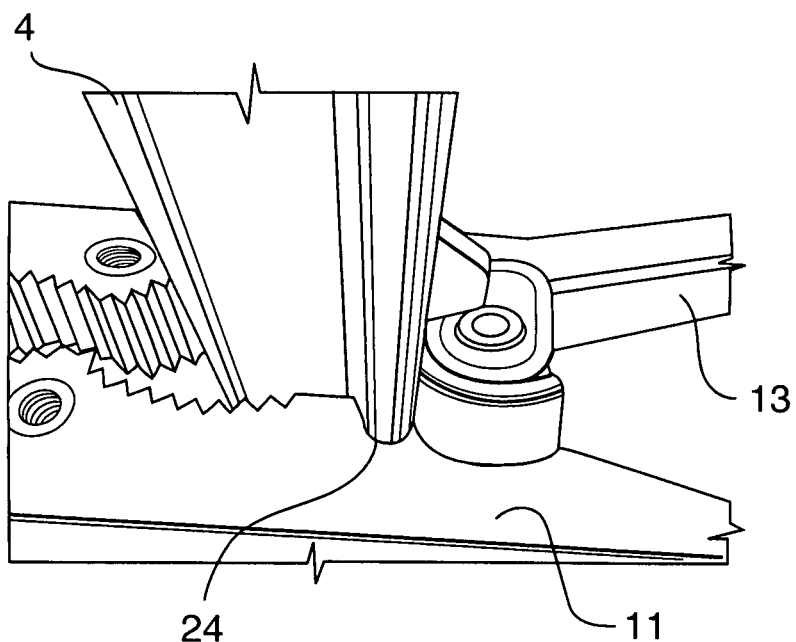
FIG. 4 is a left side perspective view of the attachment clamp on a T-post.
Figure 5:
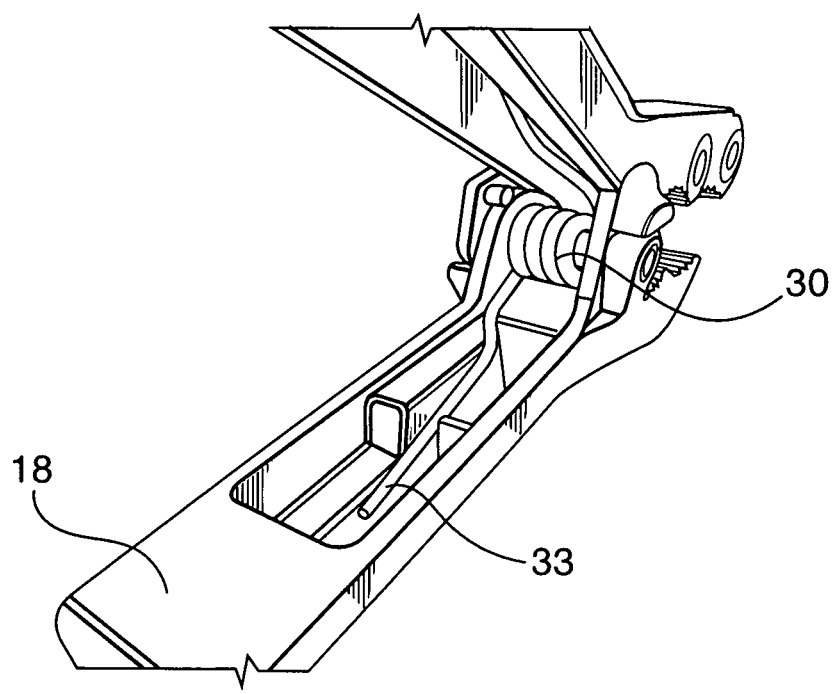
FIG. 5 is a bottom perspective end view of the clamp showing the spring.
Figure 6:
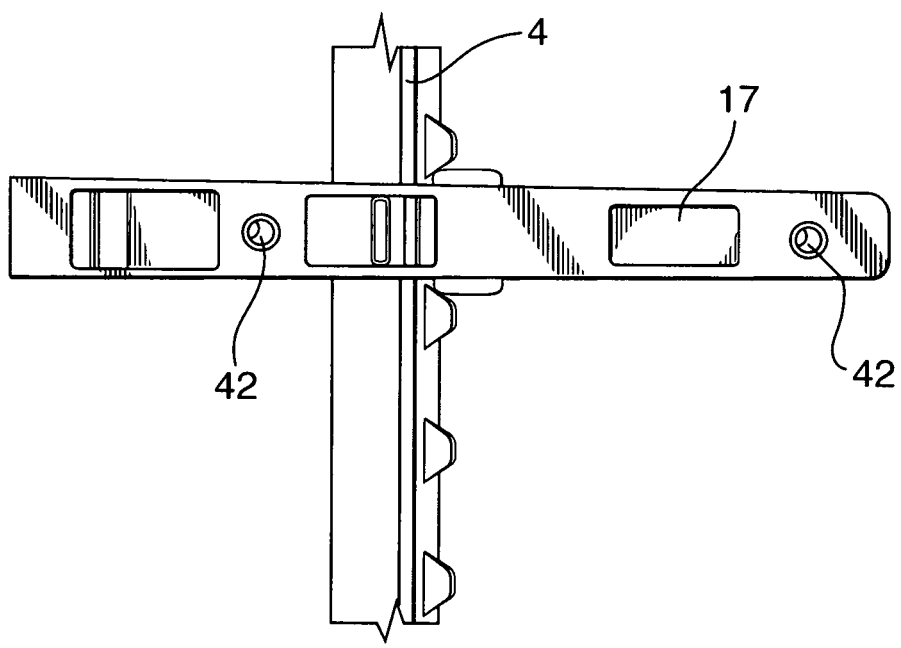
FIG. 6 is a left side view of the clamp showing two threaded inserts.
Figure 7:
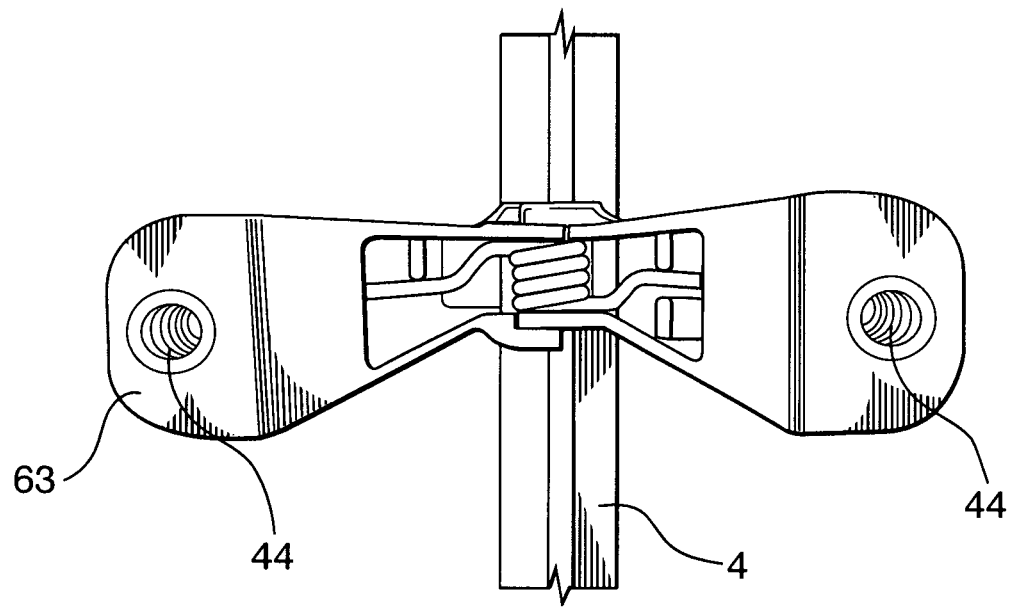
FIG. 7 is a bottom view of the clamp showing two threaded inserts on the ends of the clamp handle grips.
Figure 8:
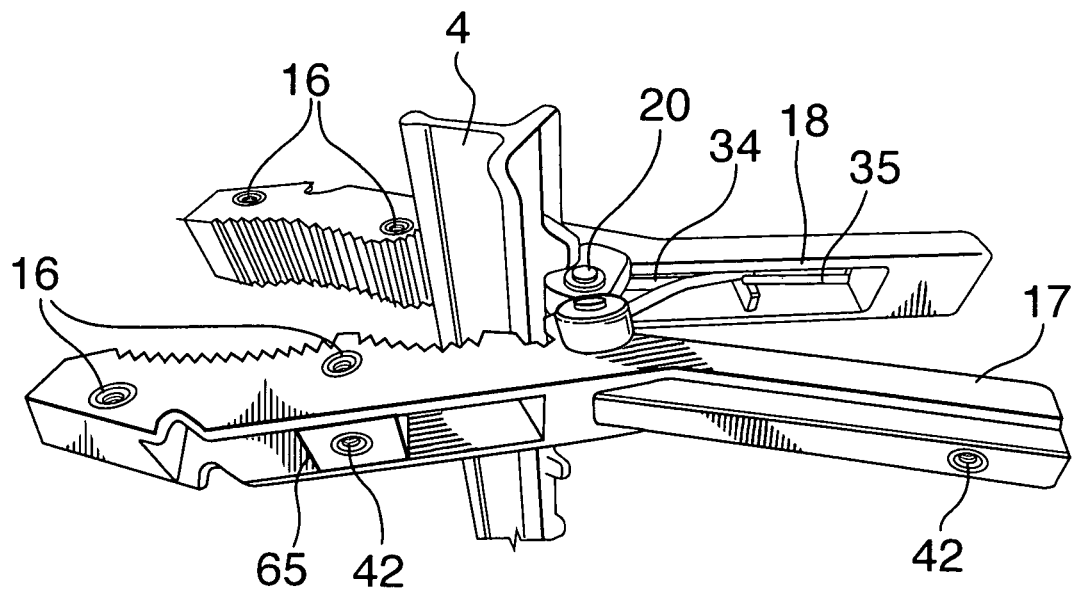
FIG. 8 is a left side view of the clamp.
Figure 9:
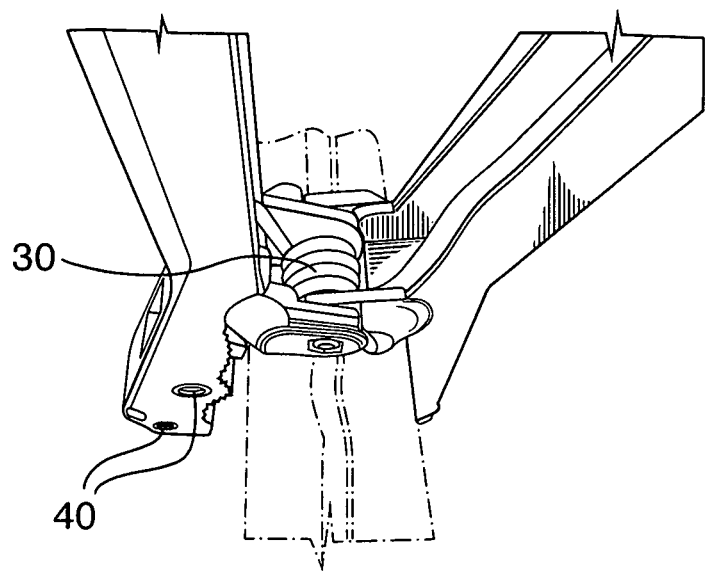
FIG. 9 is a perspective bottom view of the clamp.
Figure 10:
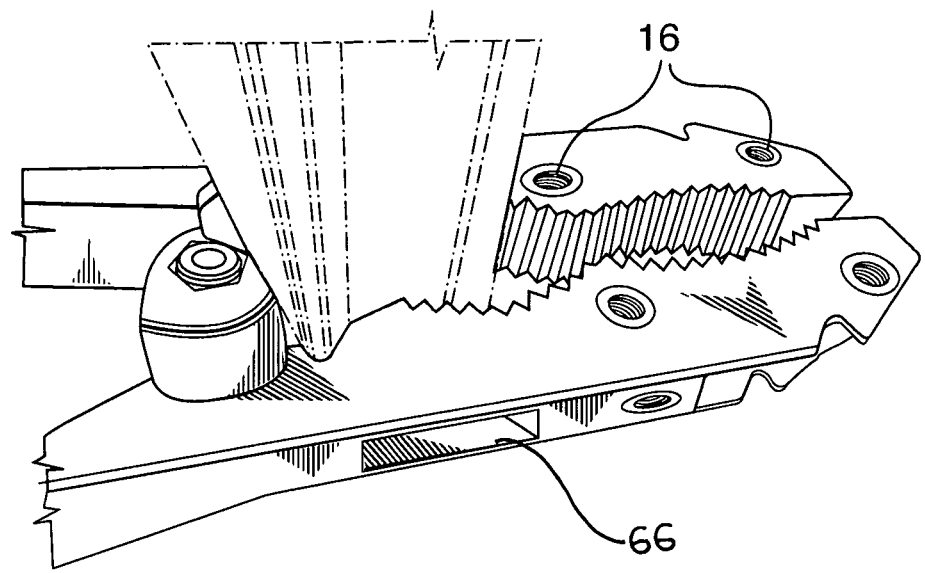
FIG. 10 is a right perspective view of the clamp.
Figure 11:
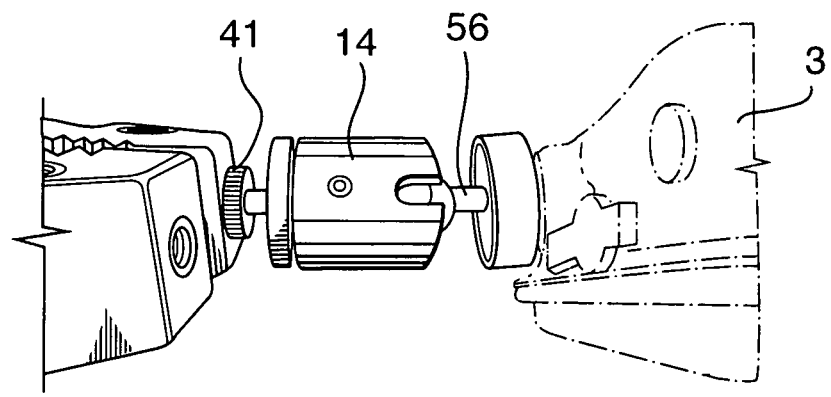
FIG. 11 is a right side view of the clamp with the swivel mount holding a decoy camera.
Figure 12:
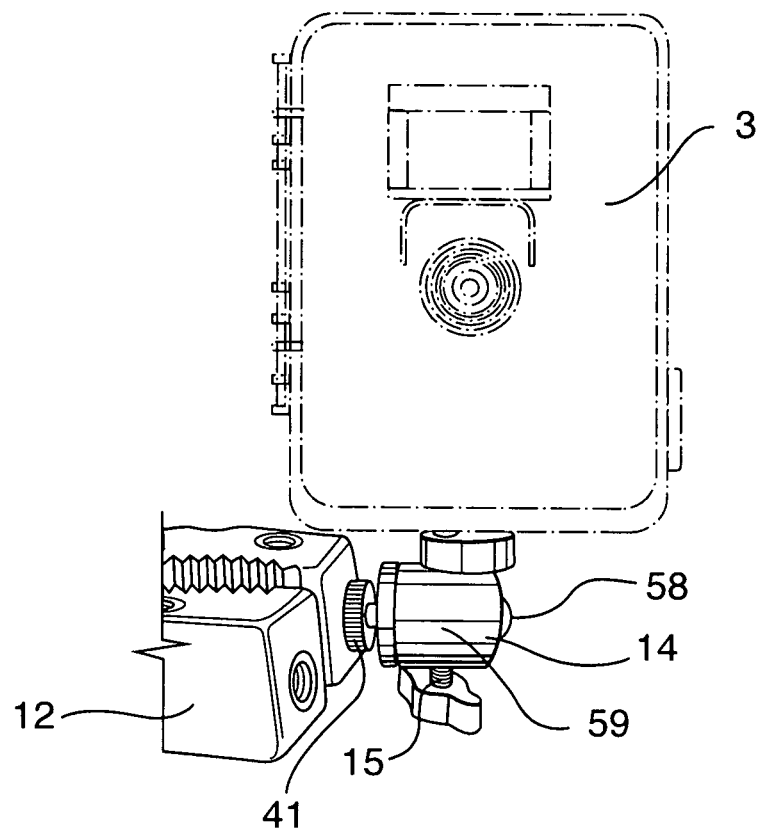
FIG. 12 is a right side view of the clamp and swivel mount holding the camera in an upright position.
Figure 13:
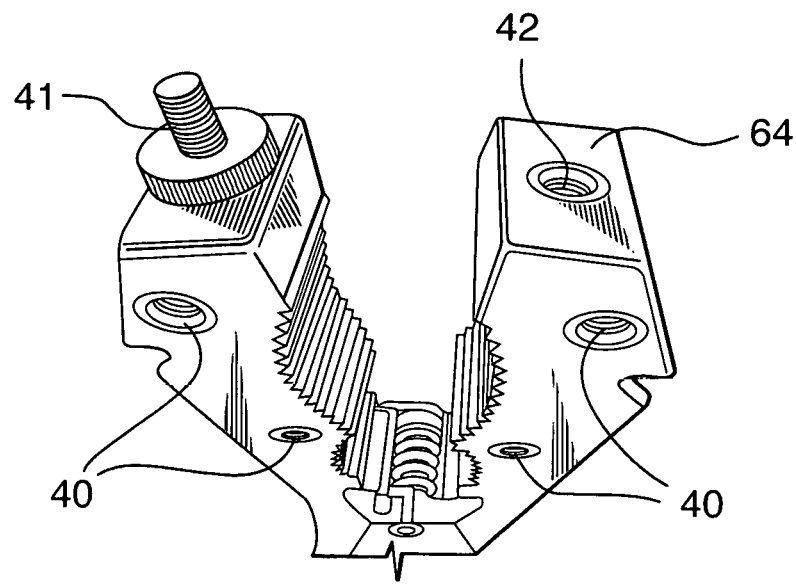
FIG. 13 is a top perspective view of the clamp with a stud threaded into one of the top threaded inserts.

The two arcuate sets of inward facing teeth, and inner set 28 and an outer set 27. Each of the two sets face toward each other so that when a longitudinal member such as a tree limb, rod or pipe is captured between either set of arcuate teeth, the two jaws 11 and 13 urge their teeth toward one another and therefore, firmly grasp the longitudinal member. The longitudinal member need not be smoothly formed as the teeth are urge against whatever surface they contact. Between the hinges and the inner jaws 28, are two rectangular notches 24 which will receive the opposing flanges of a T-post 4, as shown in the Figures, in particular in FIG. 4. The notches 24 are arranged and sized to firmly grasp the flanges of the T-post. This particular arrangement provides an especially steady grip of the clamp onto a T-post.

The clamp includes a plurality of female threaded inserts 44 cooperatively engaging threaded rods for attaching a decoy camera or any other desired device to the clamp 12. The threaded inserts are preferably quarter-20 threaded inserts but may be any other desired size of threads. On the front side 61 are four inserts 16. On the back side 62 are four inserts 40. On the right side 66 and left side 65 are four inserts 42 (two on each side). On the top side 64 and bottom side 63 are four inserts 44 (two on each side).

A pair of arcuate backward angled notches 26 are formed in the outer surface of each arm near the distal end for aligning and holding a cord or wire wrapped around the jaws 7 and 9 after attachment to a support member.

As an option the jaws 7 and 9 may include channels 49 formed therein on the sides to reduce weight and the handles 17 and 18 may include webbing 51 or channels 53 formed in the interior surface to reduce weight while providing the requisite structural support.

Figure 3:
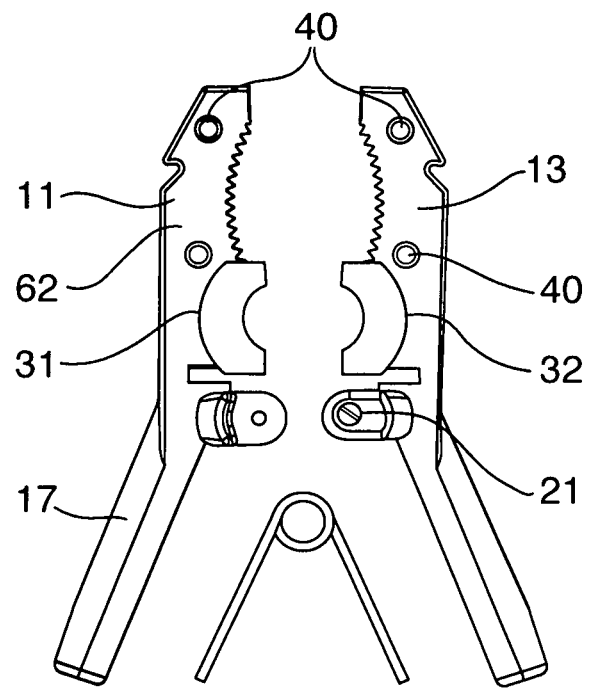
FIG. 3 is rear view of an attachment clamp showing elastomeric jaw covers.

When attaching a device to a hard smooth rod, the arcuate rows teeth will hold but may slip. A tighter grip is provided when the elastomeric jaw covers 31 and 32 are placed over the two arcuate rows of teeth 28 as shown in FIG. 3. When the clamp is installed onto a smooth rod, a pair of rubber or elastomeric jaw covers 37 will deform against the surface of the rod and grip it tightly.

Figure 14:
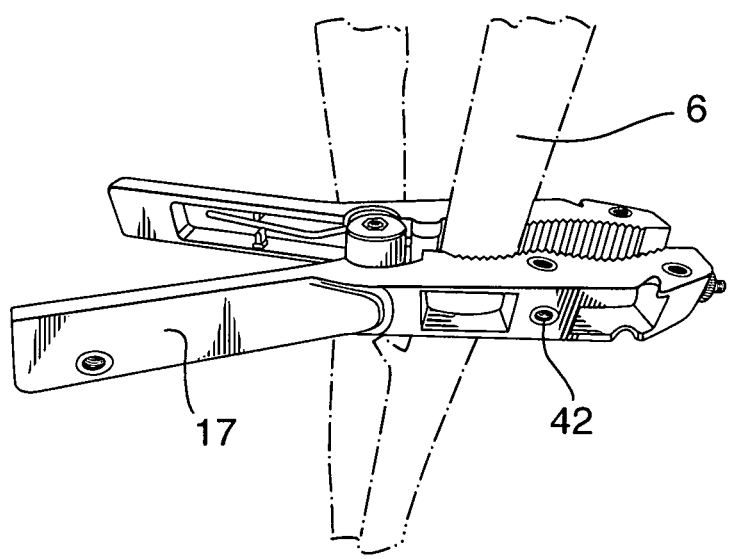
FIG. 14 is a right perspective view of the clamp installed onto a tree trunk.
Figure 15:
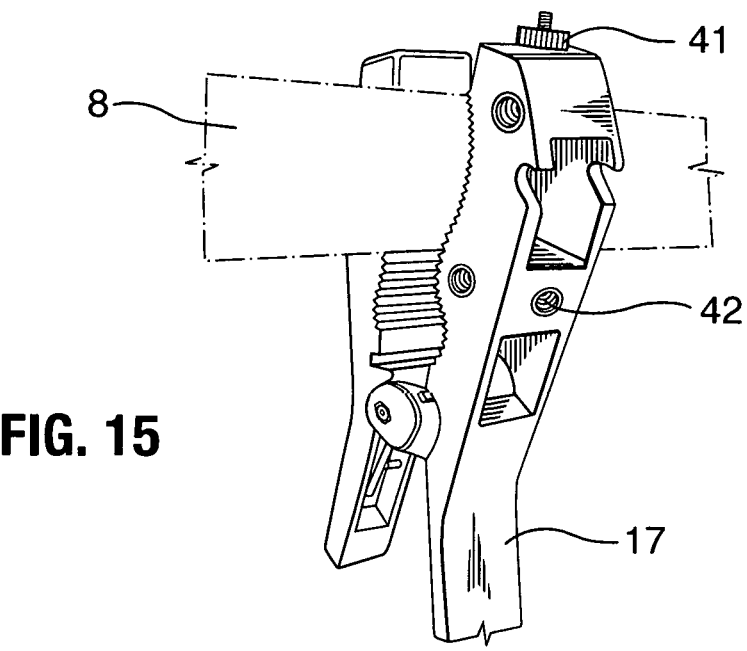
FIG. 15 is a front perspective view of the clamp installed on a horizontal pipe.

FIG. 14 shows the clamp installed onto the trunk of a small tree 6. The arcuate rows of teeth are well suited to firmly grasp the trunk of the tree 6. FIG. 15 shows the clamp installed onto a horizontal pipe 8. Depending on the surface conditions of the pipe, the installation may be secure enough, but perhaps, the inclusion of elastomeric covers 31 and 32 would provide a more secure installation.

Figure 16:
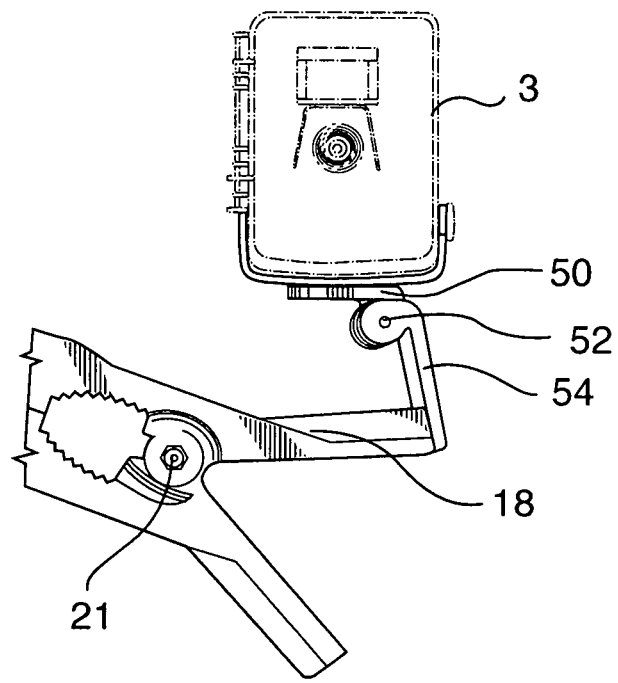
FIG. 16 is a front view of a clamp with an alternate none swiveling mount comprising two angle brackets connected by a common screw.
Figure 17:
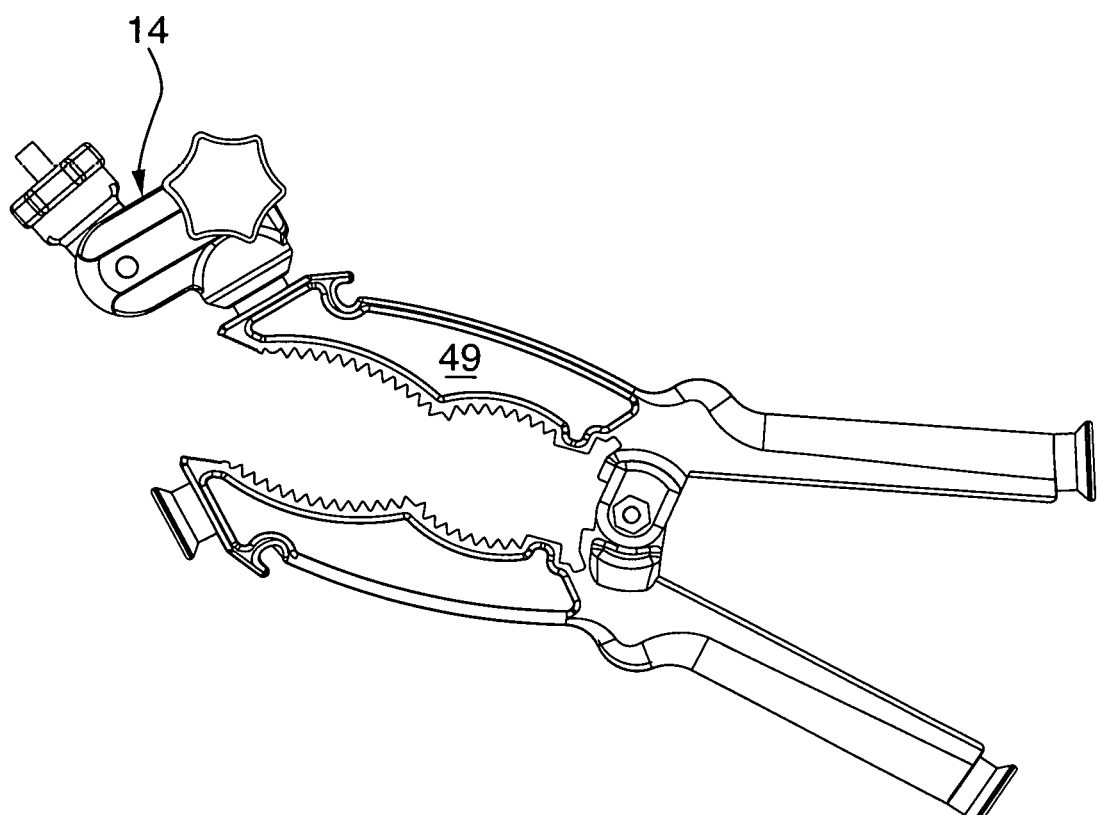
FIG. 17 is a perspective view of a clamp including a clamp connector extending from a tip thereof.
Figure 18:
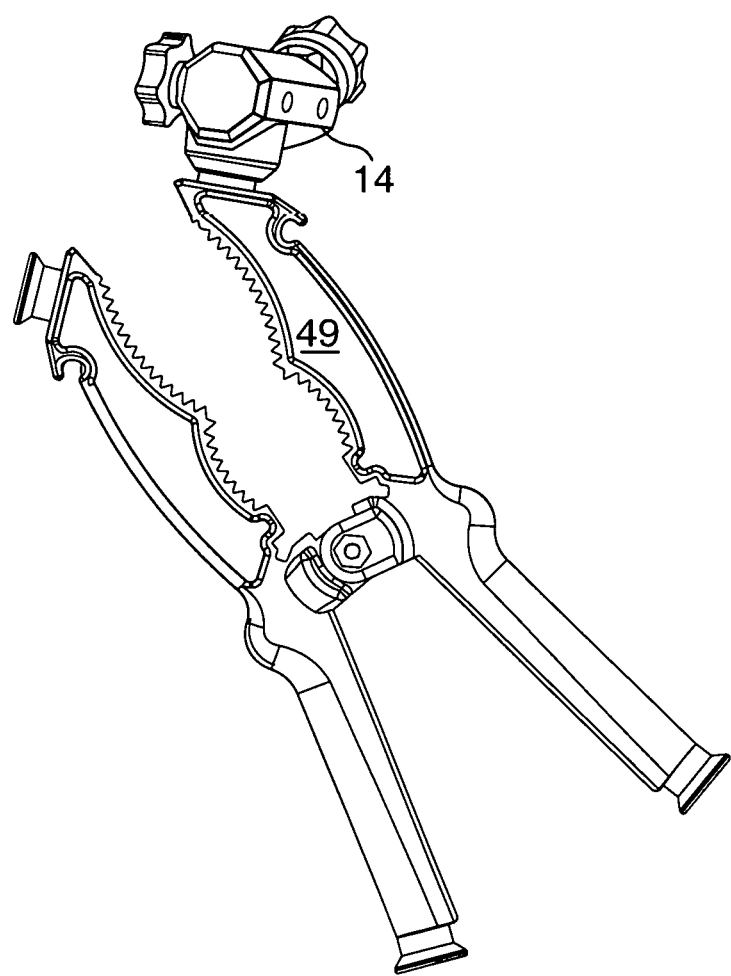
FIG. 18 is a side view of the clamp of FIG. 17.
Figure 19:
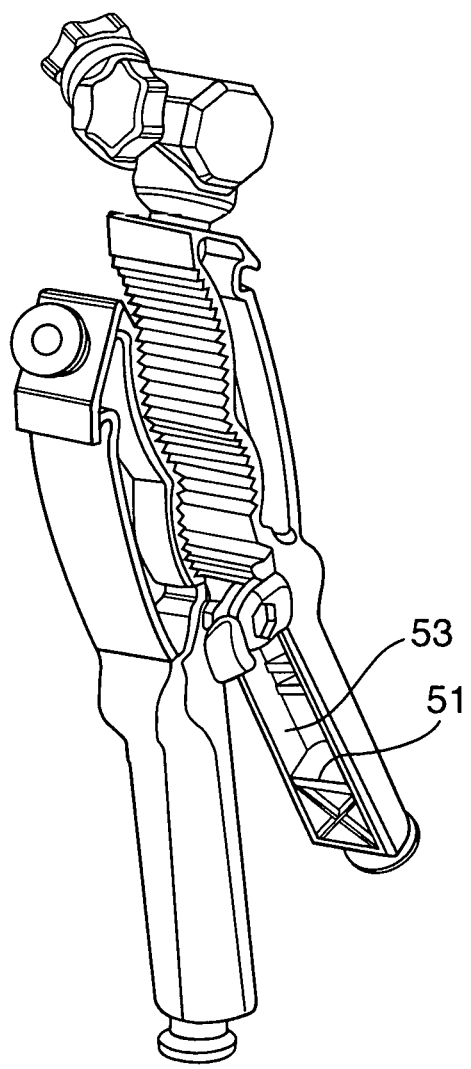
FIG. 19 is an elevational view of the clamp and connector of FIG. 17.

As shown in FIG. 16 a non-swivel mount containing two angle brackets 50 and 54 are hinged together with a hinge pin 52. The non-swivel mount is connected at one end to a threaded insert in the clamp 12 with a screw and at the other end to a camera 3 with another screw.

As shown in the figures, a swivel mount 14 includes a split body 57, 60 into which is threaded screw 41 which is also threaded into one of the threaded inserts of the clamp 12. The body 59 contains an adjustable pivoting member 58 including spherical portion which is free to swivel within the body 59 until a clamping knob 15 holding the split body portions 57 and 60 together is tightened. The spherical member 58 includes and outward extending threaded longitudinal member 56 which is firmly threaded into the decoy camera or other device which a user wants to be mounted. The user may loosen the clamping knob 15 and swivel the camera to a desired arrangement and then tighten the knob 15 to hold the camera in place.

FIGS. 25-39 show an adjustable camera visor 90 for mounting onto a game camera 3 to protect the lens form rain and snow and to provide a sun shade preventing sunlight from interfering with photographs. As shown the visor 90 includes a top or canopy 91 having a top surface 92 and bottom surface 93 comprising a thin section of material such as a plastic having generally straight side and rear edges with rounded corners and a front edge curved having a parabolic shape. A cross-sectional view depicts an arched or arcuate top wherein the side edges are lower than the center of the canopy providing shading of a game camera lens and drainage from rain. The canopy mounted to the top of the game camera using a block 71 as a spacer means and rivet or screw 72 to adjustably secure the canopy to the spacer block which has a flat bottom surface and a top surface formed or cut at an angle of up to 20 degrees and preferably about 5 degrees in order to angle the visor downward with respect to the top of the game camera. Rotation of the visor is provided by the screw attachment allowing adjustment of the visor in a 360 degree pattern in the x-axis and adjustment in the y-axis of a selected angle based on the angle of the spacer block disposed between the visor and the camera mounting point.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

I claim:

1. An attachment clamp comprising:

a clamp body having a front side, a rear side, a bottom side, a top side, a left side and a right side, said clamp body includes two toothed left and right jaws and two left and right handle grips, at a junction of said left jaw and handle grip is a first inward extending hinge, at a junction of said right jaw and handle grip is a second inward extending hinge, said hinges overlap one another, a threaded hinge pin rotatably connects said hinges, a nut is threaded secures said hinge together;

said threaded hinge pin passes through a coil spring which is captured inside said two hinges, two outward extending spring arms of said coil spring are captured in said handle grips, said spring arms urging said handles grip outward and thus said left and right toothed jaws are urged toward each other;

said clamp including sixteen female threaded inserts for attaching a decoy camera to said clamp body, said threaded inserts being quarter-20 threaded, on said front side are four inserts, on said back side are four inserts, on said right side and left side are four inserts, on said top side and bottom side are four inserts; and said left jaw and said right jaw include two arcuate sets of inward facing teeth, an inner set and an outer set, each of said two sets facing toward each other, between said left and said right hinges and said left and said right inner jaws are two rectangular notches sized to receive opposing flanges of a T-post.

2. The attachment clamp of claim 1 further including two elastomeric jaw covers configured to be placed over said two inner set of arcuate rows of teeth said two elastomeric jaw covers coming together when said jaws are urged together where upon a combination of said two elastomeric jaws has a circular aperture formed therein having a diameter less than a diameter of a pipe onto which said clamp combination is to be installed.

3. The attachment clamp of claim 1 including a game camera.

4. The attachment device of claim 3, further including a rotatable visor mounting to a spacer block at a selected angle affixed to a top surface of said game camera.

* * * * *